Dec. 8, 1953     C. W. MOTT     2,661,674
VEHICLE MOUNTED HYDRAULIC TYPE POWER TRANSMITTING UNIT
Original Filed Dec. 31, 1943     5 Sheets-Sheet 1

Dec. 8, 1953 C. W. MOTT 2,661,674
VEHICLE MOUNTED HYDRAULIC TYPE POWER TRANSMITTING UNIT
Original Filed Dec. 31, 1943 5 Sheets-Sheet 2

Inventor:
Carl W. Mott,
By Paul O. Pippel
Attorney.

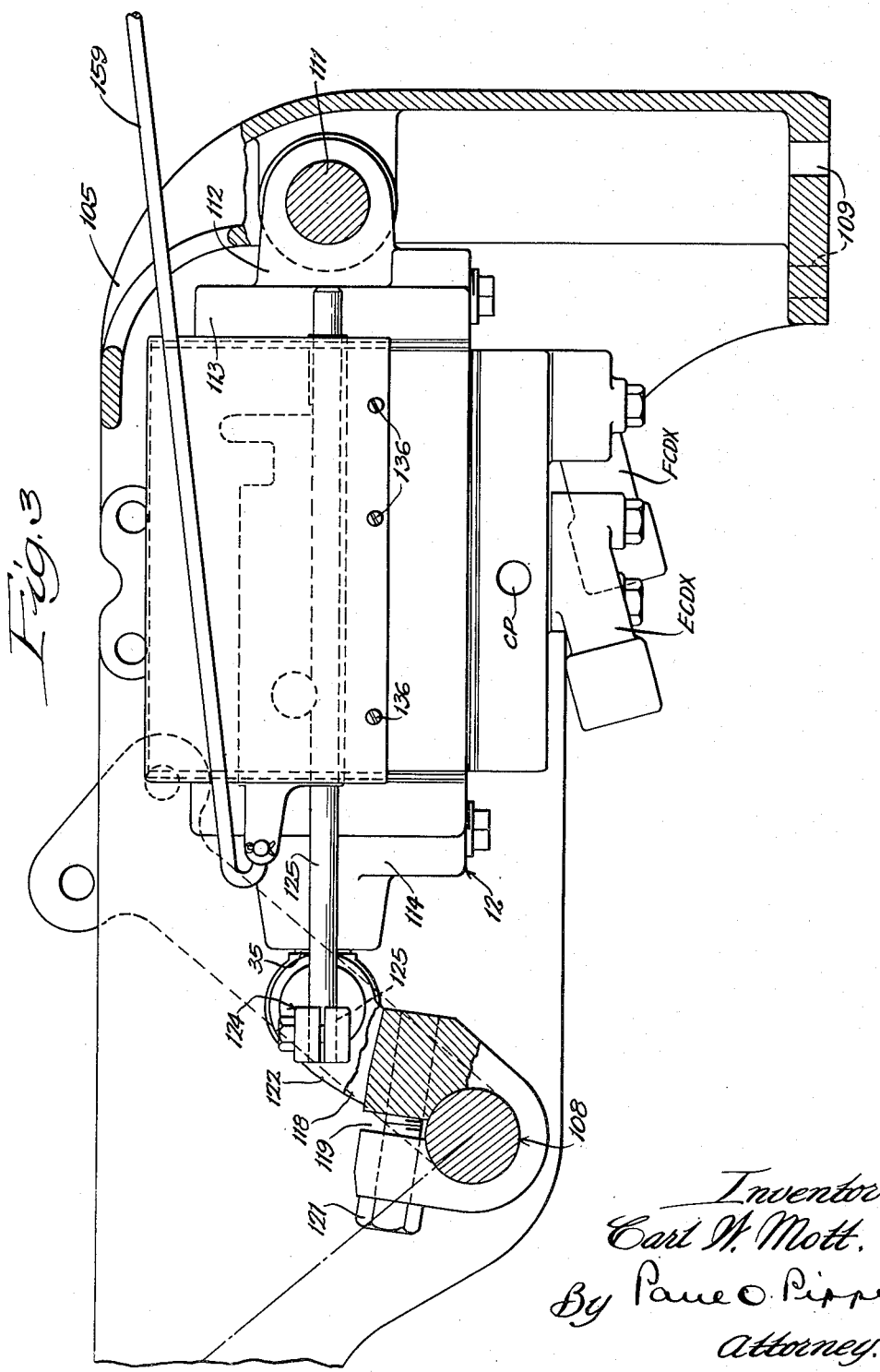

Dec. 8, 1953     C. W. MOTT     2,661,674
VEHICLE MOUNTED HYDRAULIC TYPE POWER TRANSMITTING UNIT
Original Filed Dec. 31, 1943     5 Sheets-Sheet 4
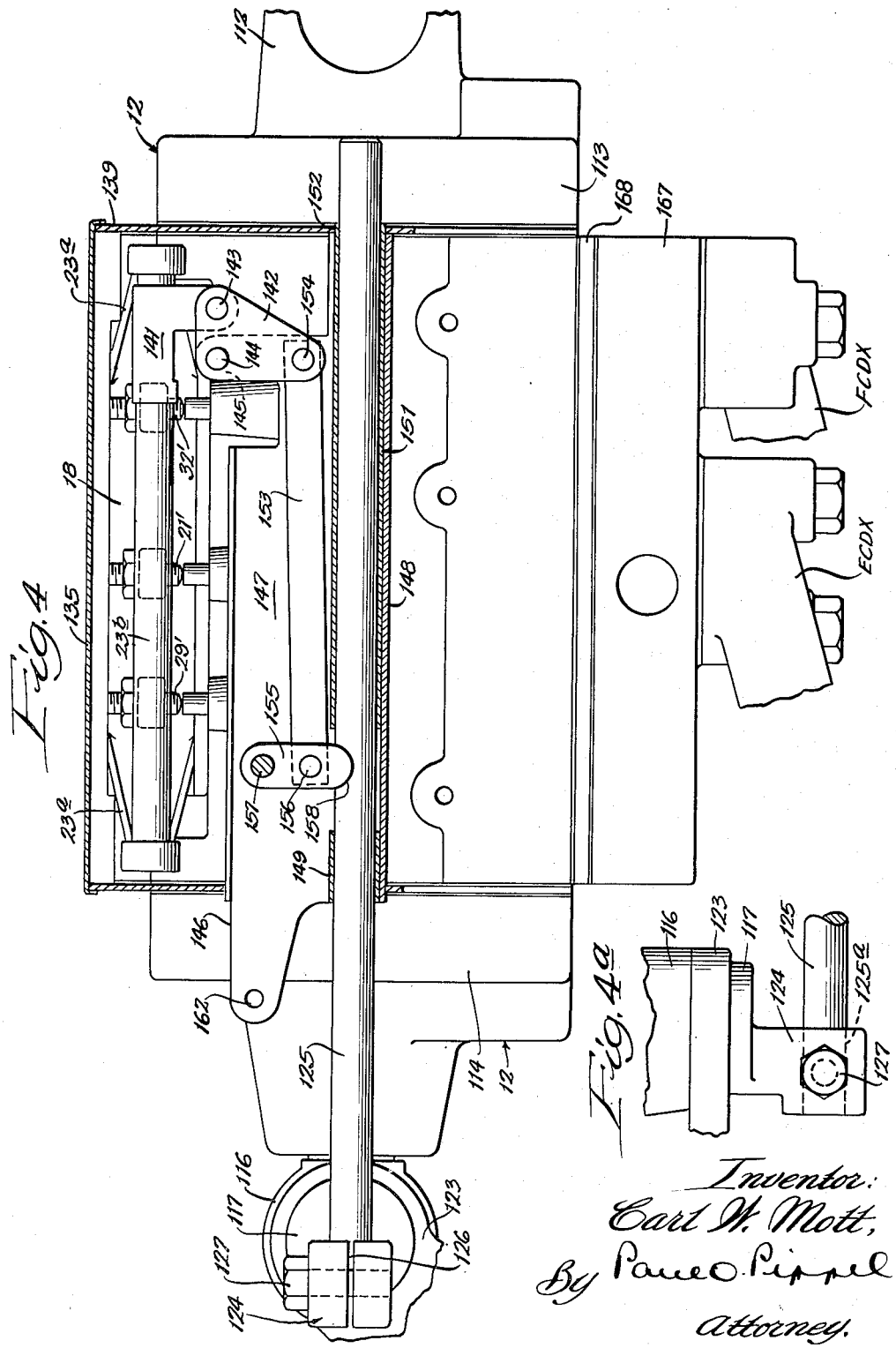
Inventor:
Earl W. Mott,
By Paul O. Pippel
Attorney.

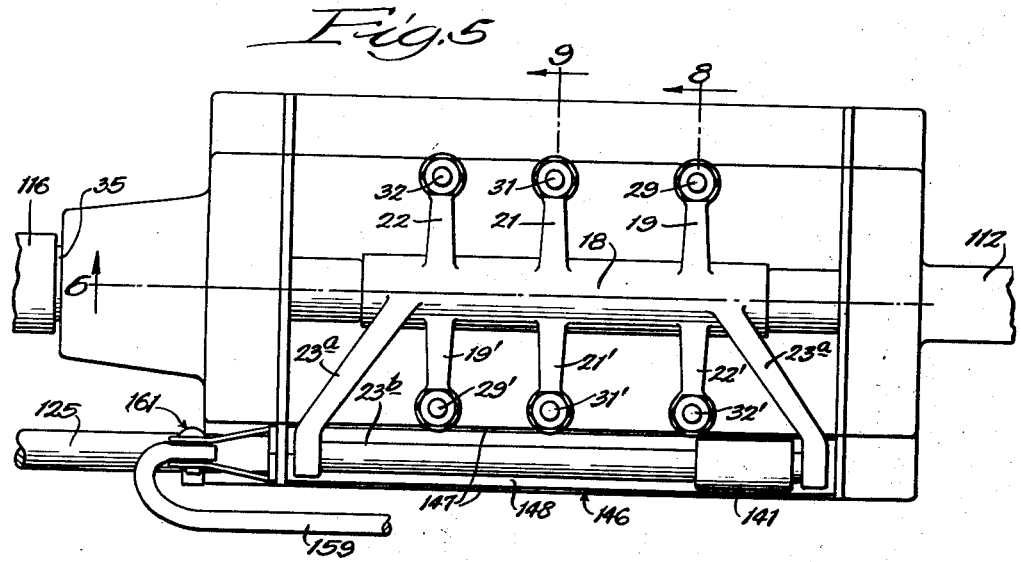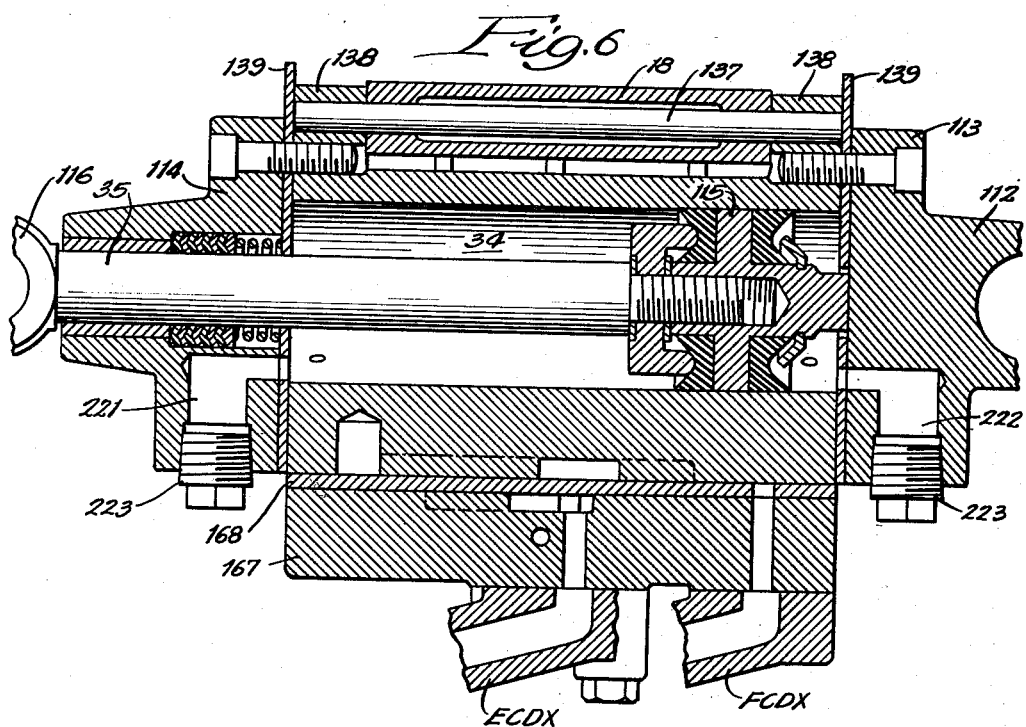

Patented Dec. 8, 1953

2,661,674

UNITED STATES PATENT OFFICE 2,661,674

VEHICLE MOUNTED HYDRAULIC TYPE POWER TRANSMITTING UNIT

Carl W. Mott, La Grange, Ill., assignor to International Harvester Company, a corporation of New Jersey Original application December 31, 1943, Serial No. 516,470. Divided and this application March 23, 1948, Serial No. 16,574

4 Claims. (Cl. 97—46.59)

This invention, previously disclosed in my application Serial No. 516,470, filed December 31, 1943, now abandoned, of which this application is a division, concerns a hydraulic-type power transmitting unit mountable upon a tractor for manipulating or operating equipment associated with the tractor, and more particularly concerns an improved arrangement of parts of such unit with respect to one another and to the tractor.

One important object of this invention is the provision upon a tractor of a fluid power system having a fluid-driven auxiliary power supplying motor disposed upon the tractor body within a space between the tractor engine and the operator's station, thus employing otherwise unused space as well as locating the motor strategically with respect to equipment to be operated thereby.

A further object is the provision of a novel casing mountable between the tractor engine and the operator's station to enclose the auxiliary motor as well as to include reaction supports respectively for said motor and a rock-shaft or the equivalent drivable thereby, and it is the further contemplation that this casing be employed as a support for the tractor fuel tank or other superstructure of the tractor.

Another object is the provision upon a tractor of a fluid-operated power supply system including a motor on the tractor body between the engine and operator's station together with a motor control unit, wherein there are reversibly movable counterparts respectively manually movable by a simplified extension to the operator's station to start the motor and movable by the motor work member to stop the motor following predetermined movement of said work member.

Another object is the provision of an improved valve-operating mechanism having parts independently movable respectively manually and by the motor work member to cooperably start and stop the motor.

These and other desirable objects encompassed by and inherent in the invention will be more readily comprehended upon reading the ensuing description with reference to the annexed drawings, wherein:

Fig. 1 is a diagrammatic view showing the parts of a fluid medium power transmitting and control system by means of which a fluid propelled motor is drivable by fluid received from a constant delivery source, there being a pressure-regulating device for causing by-pass of the fluid from the outlet to the inlet of the source, the casings of the motor and device being shown in section to disclose passages and valves therein;

Fig. 3 is a fragmentary sectional view of the motor enclosing casing shown in Fig. 2 but looking in the opposite direction to which this casing is viewed in Fig. 2, the figure also showing in side elevation a motor and its mounting within said casing as well as a rock-shaft mounted in the casing for operation by said motor;

Fig. 4 is an enlarged side elevational view of the fluid driven motor illustrated in Fig. 3 with a section of a control apparatus shroud cut away for exposing said apparatus;

Fig. 4ᵃ is a fragmentary plan view of the connection between the motor piston rod or work member and a part of the control apparatus;

Fig. 5 is a plan view of the fluid driven motor and the valve actuating means or control apparatus associated therewith;

Fig. 6 is a vertical sectional view taken axially through the fluid driven motor.

Before describing the fluid power transmitting and control system in the commercial embodiment illustrated in Figs. 2 to 6, the broad principles of operation of the system will first be explained with respect to the somewhat diagrammatic embodiment or layout shown in Fig. 1.

Figure 1:
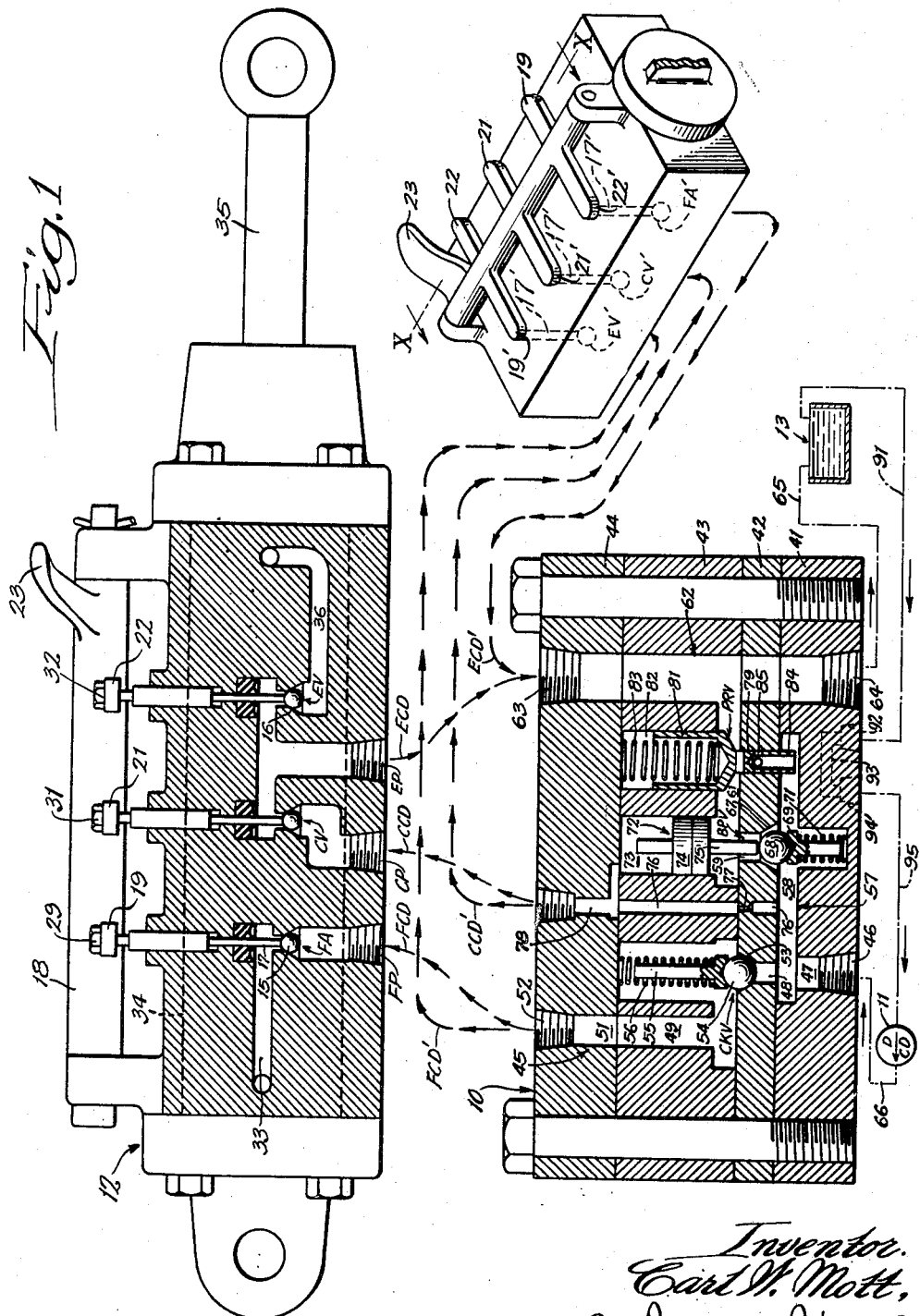

That form of the invention shown in Fig. 1 includes pressure-regulating apparatus in which there is a pressure-regulating unit 10 for controlling the flow of fluid from a constant delivery source or pump 11, shown schematically, to a reciprocating type of motor or ram 12 or alternatively to a reservoir 13 for recirculating through the pump at low pressure. In addition to the pressure-regulating unit proper which is designated 10, the pressure-regulating apparatus includes certain valves which are disposed remotely from said unit and in the present installation are incorporated into the casing structure of the motor 12. These valves are in two sets of three, one set of valves being upon each side of the motor. Each set of valves, of which one is shown in the upper part of the figure, includes a normally closed fluid-admittance valve FA, a control valve CV, and an exhaust valve EV. Each valve includes a ball 15 normally held upon a seat 16 by means of a spring, not shown. These balls are unseatable against the force of their respective springs (not shown) and against the force of a slight fluid pressure, presently to be explained, by means of associated reciprocal valve-operating stems 17.

A pivotable valve-operating member 18 has two sets of tappet arms, of which the set for operating the valve stems 17, shown in the upper part of Fig. 1, consists of arms 19, 21, and 22. The other set of tappet arms, which respectively correspond to the arms 19, 21, and 22, are indicated by the numerals 19', 21', and 22' in the right-hand portion of Fig. 1, which consists of a perspective view of the motor with the side nearer to the observer which is opposite to the observer as the motor is illustrated in the upper part of Fig. 1. Proper orientation of the two views of the motor shown in the upper part of the figure and in the right-hand part of the figure, will be assisted by reference to the line X—X in the right-hand part which indicates a plane upon which the section shown in the upper part is taken. A lever 23 projecting from one side of the pivotable control member 18 is provided for the application of pivotable force to said member, and threaded tappet members 29, 31, and 32 are provided in the ends of the tappet arms 19, 21, and 22 for engaging the upper ends of the valve stems 17. When the operating lever 23 is pressed downwardly, the lower ends of the threaded tappet members 29, 31, and 32 will abut against the upper ends of said valve stems for depressing the same and concurrently unseating the valve balls 15 of the valves FA, CV, and EV. This operation is for permitting the entrance of fluid under pressure through a port FP past the valve FA and through a channel 33 into the left end of the motor or ram cylinder 34, as viewed in the upper part of Fig. 1, for moving a piston or plunger 115, Fig. 6, and a piston rod 35 connected to such piston to the right. Pursuant to the movement of said piston to the right, it causes the exhaust of fluid from the right end of the cylinder through an exhaust passage 36 upwardly past the valve EV and outwardly of the motor casing through a port EP. The control valve CV is for controlling the setting of the pressure-regulating unit 10 in a manner hereinafter described, wherefore, upon the opening of said valve CV, said unit will be changed from a by-pass condition in which fluid is circulated at low pressure between the pump outlet, the reservoir, and the pump inlet to a condition in which the fluid is discharged from said unit at high pressure to the fluid-admittance port FP of the motor.

When the control lever 23 is lifted, the tappet members 29, 31, and 32 are lifted from the upper ends of the valve stems 17 to permit closing of the valves FA, CV, and EV. Upward movement of the lever 23 past the neutral position illustrated in Fig. 1 will cause the tappet members 29, 31, and 32 to be raised or separated from the upper ends of their associated valve stems, while tappet members, not shown, in the arms 19', 21', and 22' will be effective for depressing valve stems for operating valves respectively corresponding to the valves FA, CV, and EV, which cause fluid to be introduced into the right end of the cylinder 34 for moving the piston and its rod 35 to the left while expelling fluid from the left end of the cylinder through a passage, not shown, corresponding to the exhaust passage 36. The diagrammatically represented conduits FCD, CCD, and ECD, which respectively communicate with the ports FP, CP, and EP, are duplicated by conduits FCD', CCD', and ECD', which communicate in the same manner with ports corresponding to the ports FP, CP, and EP, which are employed when the piston is to be moved to the left as aforesaid.

The pressure-regulating unit 10 comprises a laminated casing consisting of a lower plate 41, a valve seat plate 42, an intermediate plate 43, and a crown plate 44. A fluid delivery passage 45 for communication between the discharge section of the pump 11 and the motor, includes a port 46 in the plate 41, a fluid delivery passage portion 47 in said plate, a portion 48 in the plate 42, portions 49 and 51 in the plates 43 and 44, and a port 52 in the plate 44 for the connection of the conduits FCD and FCD'. In a generic sense, when considering the apparatus as a whole, these conduits FCD and FCD', as well as the ports as FP and the channels as 33 constitute portions of the fluid delivery passage. A check-valve CKV for the fluid delivery passage 45 consists of a valve seat 53, a ball 54, a ball follower 55, and a spring 56, which compresses the follower against the ball for urging the latter upon the seat.

A by-pass passage 57 includes a channel 58 in the upper face of the plate 41, a hole 59 through the plate 42, and a channel 61 in the lower face of the plate 43. This channel 61 communicates with a fluid return passage 62, which is made up of holes vertically alined in the plates 41—44, there being threaded ports 63 and 64 at the ends of this fluid return passage. Here again the fluid return passage in a broader aspect is regardable as including the exhaust passages as 36 in the motor casing, the ports as EP in such casing, the conduits ECD and ECD', and a conduit 65 connecting the port 64 with the reservoir 13. Since the fluid returned through the fluid return passage 62 into the reservoir 13 is simply stored in this reservoir preparatory to being again discharged through the pump 11, the pump and reservoir may be logically regarded as the constant delivery source, that part of the reservoir into which the conduit 65 discharges regarded as the fluid-receiving section of such source, and the fluid discharge section from which the conduit 66 leads from the pump 11, regarded as the fluid discharge section of such source. Communication between the reservoir 13 and the pump 11 is established through a conduit 91, a casing port 92, a casing duct 93, a casing port 94, and a conduit 95. A by-pass valve BPV controls the passage of fluid through the by-pass passage 57, the valve comprising a seat 67 in the passage portion 59, a ball 69, a ball follower 69, and a spring 71 for urging the follower against the ball for tending to press the latter in closing seating relation on the seat 67.

Pressure-responsive valve-controlling means 72 for controlling the open and closed position of the by-pass valve BPV includes a chamber 73 in the plate 43. This chamber 73 is cylindrical and contains a piston 74, which carries a valve stem 75 abuttable against the ball 68 for pressing the ball into the open position shown when the pressure in the chamber 73 above the piston 74 sufficiently exceeds the pressure in that part of the chamber below the piston.

Fluid pressure for forcing the piston 74 downwardly is obtained through a pressure transfer passage 76 which communicates with the constant delivery source through a small diameter section 77 of restricted flow capacity, a part of the by-pass passage, the port 46, and the conduit 66. A control passage 78 communicates with the chamber 73 and with the transfer passage 76 for withdrawing fluid from this chamber and passage to diminish the pressure in the chamber 73 to permit the raising of the piston 74 and the closing of the by-pass valve BPV when it is desired to establish the high-pressure condition in the apparatus. Normally, fluid will be trapped within the chamber 73 by the normally closed control valve CV upon the motor casing. When the valve CV is open, as explained hereinabove, fluid escapes from the chamber 73 and the transfer passage 76 through the control passage 78 and the conduit CCD, which comprises a part of said passage, past the valve CV, through the port EP into the fluid return passage 62, and back to the constant delivery source. It will be seen that when the valves FA and EV, for respectively admitting fluid to one end of the cylinder 34 and exhausting it from the opposite end of the cylinder, are open, the control valve CV, which is concurrently open, will cause the pressure-responsive valve-controlling means 72 to function for causing closing of the by-pass valve BPV so that high pressure will be built up in the fluid delivery passage 45 for delivery of fluid at a sufficiently high pressure for moving the piston against the resistance of a substantial load.

A pressure-relief valve PRV for preventing the building up of excessive pressure in the fluid delivery passage, is operable to control the escape of fluid through the by-pass passage 57 and outwardly through a hole 79 in the plate 42 to the fluid return passage 62. This pressure relief valve comprises an enlarged cylindrical spring-receiving cup 81 slidable within a recess 82 formed by a hole in the plate 43 and the under face of the crown plate 44. A spring 83 compressed between the bottom of the spring-receiving portion 81 and the under face of the plate 44, constantly urges a small diameter portion 84 depending from the portion 81 downwardly in the hole 79. Upon the development of a predetermined maximum pressure within the fluid delivery passage and hence in the by-pass passage 57 for reacting upwardly upon the small diameter portion 84, this portion will be forced upwardly against the opposition of the spring 83, whereby holes 85 in the portion 84 will be elevated above the upper face of the plate 42 to provide communication between the by-pass passage and the fluid return passage.

Operation of the apparatus in Fig. 1:

The apparatus is illustrated in Fig. 1 in the by-pass condition with the motor at rest. While this condition prevails, the piston (not shown) will be locked against axial movement within the cylinder 34, since fluid upon the right end of the piston cannot escape past the exhaust valve EV, and fluid upon the left end of the piston cannot escape past the check-valve CKV. Fluid delivered into the unit 10 through the port 46, fills the transfer passage 76, the chamber 73, and the control passage 78 because of the control valve CV being closed, and sufficient pressure is applied through this fluid in the chamber 73 for forcing the piston 74 downwardly to maintain the by-pass valve ball 68 in the unseated position illustrated. It should be explained that through the conduit FCD', the check-valve CKV also operates complementally with the exhaust valve EV in preventing the escape of fluid from the right end of the motor cylinder as this cylinder is oriented in the upper part of Fig. 1, and that the valve EV' corresponding to the valve EV on the opposite side of the cylinder to that viewed in Fig. 1, operates complementally with the check-valve CKV for preventing the escape of fluid from the left end of the cylinder.

Assuming it is desired to cause the motor piston to be moved to the right as viewed in Fig. 1, the valve-operating means or member 18 will be pivoted for lowering the outer ends of the tappet arms 19, 21, and 22 to cause concurrent opening of the valves FA, CV, and EV. This opening of the control valve CV will divert fluid from the pressure transfer passage 76 and from the valve-controlling means chamber 73 into the fluid return passage 62 more rapidly than fluid can be replaced through the restricted opening 77, since the flow capacity of the control passage past the valve CV exceeds the flow capacity of the restricted passage portion 77. The reduction in pressure within the chamber 73 occurs quickly so that the combined effort of the by-pass valve spring 71 and the pressure of fluid within the by-pass passage below the ball 68 is effective for seating this ball and terminating the escape of fluid through the by-pass passage. Fluid from the constant delivery source thereupon instantaneously builds up pressure within the by-pass passage below the ball 68 and within that portion of the fluid delivery passage below the check-valve CKV sufficiently to unseat the check-valve ball and force fluid upwardly through the fluid delivery passage past the fluid-admittance valve FA, now open, and into the left end of the cylinder 34. Movement of the motor piston to the right, under the force of the fluid thus delivered into the left end of the cylinder 34, is permitted by the opened exhaust valve EV, which permits the escape of fluid from the right end of the cylinder into the fluid return passage 62.

When the motor has been operated for the length of time causing movement of the motor piston to the desired position, stopping of the motor is brought about instantaneously by pivoting the control member 18 in the direction for raising the tappet arms 19, 21, and 22, thereby causing the valves FA, CV, and EV to close. This closing of the valve FA prevents further delivery of propelling fluid into the left end of the cylinder, while such closing of the exhaust valve EV prevents further escape of fluid from the right end of the cylinder, causing the piston to be locked in the position at which it has come to rest. Closing of the control valve CV prevents further escape of fluid from the pressure transfer passage 76 and the valve-controlling means chamber 73, wherefore fluid forced into the chamber 73 through the pressure transfer passage, attains sufficient pressure for forcing the piston 74 downwardly for opening the by-pass valve. The by-pass status illustrated in Fig. 1 is thereby reestablished so that during the rest period of the motor 12, fluid can by-pass through the by-pass passage of the unit 10 from the fluid discharge section of the constant delivery source to the fluid-receiving section of such source. This low pressure by-pass will occur without materially heating the fluid and without consuming significant power.

While the valve control member 18 is pivoted for unseating the valves FA, CV, and EV to cause the high-pressure delivery of fluid for advancing the motor piston to the right, the speed at which the piston is caused to move may be selected by controlling the pivoted position of the member 18 and thereby the distance the ball 15 of the valve FA is lifted from its seat 16. By thus throttling or controlling the flow capacity past the fluid-admittance valve FA, the flow rate into the cylinder may be selectively controlled without diminishing the force with which the piston is advanced, since the fluid delivered past the fluid-admittance valve will be at a high pressure. During such a period when the admittance of fluid into the motor is at a rate less than the delivery rate of the constant delivery source, the pressure will be built up in the fluid delivery passage below the fluid-admittance valve FA and also within that part of the by-pass passage below the by-pass valve 68 to a predetermined maximum at which the pressure relief valve PRV will be operated by this pressure for establishing communication through the ports 85 of the pressure relief valve from the by-pass passage to the fluid return passage. Therefore, periodically and for short intervals the pressure relief valve PRV will serve as a by-pass valve permitting the constant delivery source to operate under a high-pressure by-pass condition. However, the periods of this type of operating condition are short and infrequent, that is, only during periods when the motor 12 is operated slowly.

The pressure relief valve PRV, in addition to serving as a by-pass valve during slow operation of the motor as aforesaid, further serves as a safety device for preventing the attainment of undesirable high pressures at any time. For example, in the sequence of events occurring when the motor is brought to rest by the closing of the valves FA, CV, and EV, should the pressure in the fluid delivery passage 45 and that part of the by-pass passage 57 beneath the ball 68 have a tendency to build excessively before the pressure of fluid within the valve controlling means chamber 73 can build up sufficiently in pressure to force the piston 74 and the ball 68 downwardly for opening the by-pass valve, this interim will incur no danger because of the presence of the pressure relief valve. Thus this pressure relief valve makes it possible for the tappet member 31 to be set for the control valve CV to open before the valves FA and EV (though it would close last in the stopping of the motor) so the motor operation response to manual control will be fast, because the regulating unit will then start functioning to terminate the by-pass condition by the time the valves FA and EV are open.

The above description of the operation is confined to the parts which are affected when the control member 18 is pivoted in the direction for manipulating the valves FA, CV, and EV. The same operations occur when the member 18 is pivoted in the opposite direction for operating the other set of valves FA'—CV'—EV' corresponding to the valves FA, CV, and EV, the only difference being that fluid is admitted to and withdrawn from respective opposite ends of the cylinder 34 to cause movement of the piston in the opposite direction.

Figure 2:
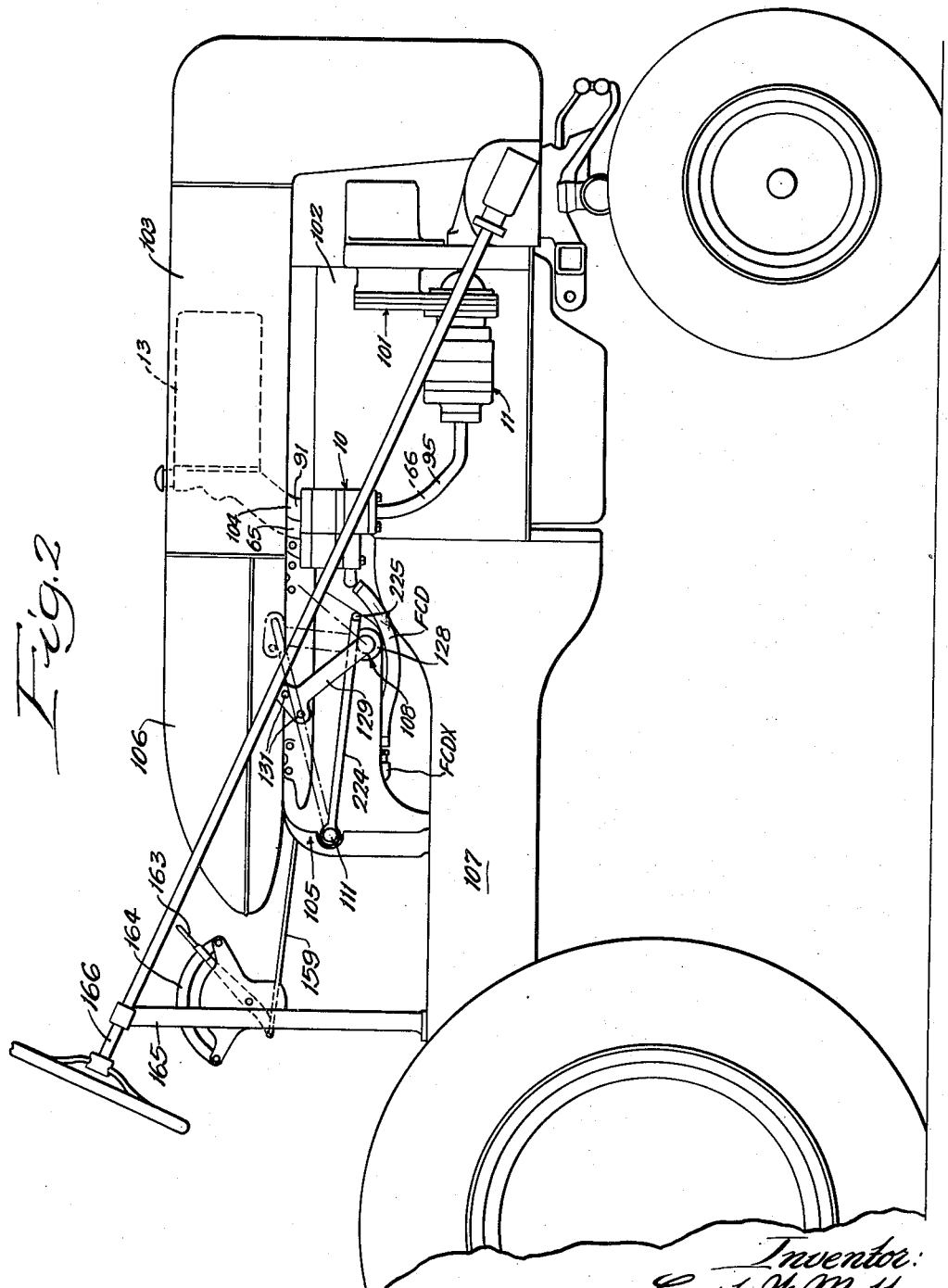
Fig. 2 is a side elevational view of a tractor having a preferred form of the present invention installed thereon.

A typical tractor installation of the present control apparatus is shown in Figs. 2 to 6. In Fig. 2, the pump 11 receives driving power from the tractor engine cam shaft, not shown, through a gear train, not shown, contained within a gear casing 101 secured to a side of the tractor engine 102. The inlet and discharge conduits 95 and 66 for the pump lead rearwardly and upwardly to the pressure-regulating unit 10, which while operating upon the principle of that shown somewhat diagrammatically in Fig. 1, has structural details as that shown in my copending application titled "Pressure-Regulating Fluid Control Apparatus," Serial No. 516,468 (now Patent No. 2,517,406), filed concurrently with said abandoned application Serial No. 516,470 of which this application is a division. The reservoir 13 is supported within a shroud 103 above the engine 102, and the conduits 65 and 91, communicating between the pressure regulator 10 and the reservoir, make up a unitary multiduct conduit member 104 which may be a metal casting. The fluid delivery conduit FCD leads rearwardly or to the left as viewed in Fig. 2 from the rear face of the pressure-regulating unit 10 to a coupling FCDX, which is communicatively attached to a lower side of the motor casing. The association of the coupling FCDX with the motor casing is more clearly shown in Figs. 3, 4, and 6. Also in Fig. 3 the manner in which the motor 12 is mounted within a casing 105 is illustrated, and in Fig. 2 it can be seen how this casing 105 also forms a support for the fuel tank 106 while resting upon a body portion 107 of the tractor. The exhaust conduit ECD, shown schematically in Fig. 1 for installation in Fig. 2, leads form the coupling ECDX, Figs. 3 and 6, to a port which is on the back side of the regulator 10 shown in Fig. 2, but which is designated 63 in Fig. 1, this arrangement of the regulator parts being clearly shown in the aforesaid copending application, Serial No. 516,468, patented August 1, 1950 as No. 2,517,406.

In Figs. 2 and 3, the L-shaped housing 105, which may be a metal casting which contains the motor 12 and which forms a support for the fuel tank 106, also carries a rock-shaft 108 which is to be actuated by the motor. The rear or vertical leg of the L-shaped housing 105 is secured to the tractor body portion 107 by bolts, not shown, inserted downwardly through holes 109 formed in the bottom of said vertical leg. Other suitable fastening means, not shown, are employed for connecting the forward end (the rightmost end as viewed in Fig. 2) of the upper and horizontal leg of such L-shaped housing to the back end of the engine 102. A bearing pin 111 in the back end of the housing 105 pivotally supports the back end of the motor 12 by means of an eye member 112 formed integrally with an end plate 113 of the motor cylinder. The opposite end of the motor cylinder is closed by an end plate 114 through which the piston rod 35 projects forwardly or to the left as viewed in Figs. 3, 5, and 6. The back end of the piston rod is suitably connected with a piston 115, while the front end of said piston rod contains an eye 116, which receives a pin 117 for connecting the piston rod with the bifurcated upper end of a lever 118 secured to a section of the rock-shaft 108 within the housing 105. The hub of the arm 118 is split as shown at 119, and a bolt 121 is connected between portions of the hub on opposite sides of the split 119 for tightening the hub in fixed relation onto the rock-shaft 108. The divided portions at the upper end of the lever 118 are disposed upon opposite sides of the piston rod eye portion 116, one of these portions being designated 122 in Fig. 3, and the other 123 in Figs. 4 and 4ª. Also in Figs. 3 and 4ª there can be seen a rod clamping device 124 formed integrally with the pin 117. This device 124 contains a bore 125ª, of which the axis runs parallel to the axis of the piston rod 35. This bore is for receiving the front end of a control rod 125, the purpose of which will be described later, and a split 126 between upper and lower portions of the device 124 serving with a screw 127 for enabling the device to be clamped tightly onto the rod 125.

Opposite end portions of the straight section of the rock-shaft 108, extending between the right and left walls of the housing 105, are journaled in such housing walls within bearings as that indicated at 128 in Fig. 2. The rock-shaft is, in fact, formed in two parts, which are joined within the hub of the lever 118 within the housing 105, and are connected together in coaxial relation by means of such hub when the bolt 121 is tightened. Each of these rock-shaft portions carries an arm 129 exteriorly of the housing 105, one of these arms being shown in Fig. 2. Consequently, when the motor piston and piston rod are moved axially within the motor, the upper end of the rock-shaft lever 118 will be moved arcuately about the axis of the compositely formed rock-shaft 106, causing the arms 129 to rock or oscillate correspondingly on the exterior of the motor housing. Holes 131 in the outer ends of the rock-shaft arms 129 provide means for the attachment of operating links or the like for the operation of tools associated with the tractor by means of force received from the motor 12 through the rock-shaft.

The valve-operating lever 18 and the parts for operating the same are enclosed within a sheet metal shroud or cover member 135, U-shaped in transverse section and securable to the motor body by screws as 136, Fig. 3. In Fig. 4, the shroud 135 is cut away, and in Figs. 5 and 6, such shroud has been removed exposing the lever 18 and the operating parts associated therewith. The hub of the lever 18 is pivoted upon a rod 137, Fig. 6, which has its two ends supported in bosses 138 which are welded, or otherwise suitably attached, to thin plates 139 connected between the cylinder and plates 113 and 114 and their respective ends of the motor cylinder. It will be observed that arms 23ª project from the hub of the lever 18 toward the opposite side of the motor from which the arm 23, shown diagrammatically in Fig. 1, projects. These arms 23ª support a slider rail 23ᵇ at their outer ends, and upon this rail a slider member 141 is slidably mounted. The rail 23ᵇ is shown in a neutral position in Fig. 4, wherein it is in a horizontal plane common to the hub of the lever 18. Force is impartable laterally to the rail 23ᵇ through the slider 141 for lifting or depressing the rail from the neutral position. When in neutral, the lever 18 will be effective through none of its arms as 19, 21, and 22 for opening any of the valves for causing motor energization. When the lever is tilted by the lifting of the rail 23ᵇ, the arms 19, 21, and 22 will condition the fluid system for causing the motor work member or piston 115 to be advanced forwardly or to the left as viewed in Fig. 6, and when the rail 23ᵇ is depressed from the neutral, the valves actuated by the arms 19', 21' and 22' will condition the fluid system for introducing fluid under pressure into the cylinder 34 on the forward side of the piston and for withdrawing liquid from the rearward side of the piston, causing it to move rearwardly or to the right as viewed in Fig. 6. Since the slider 141 is movable lengthwise of the rail 23ᵇ, force is transmittable through this slider for tilting the lever 18 in either direction from or to its neutral position irrespective of the position of the slider lengthwise of the rail.

Upward or downward force is imparted to this slider 141 for moving the rail 23ᵇ upwardly or downwardly through a differential member or lever 142. One section of the lever 142 is connected to a depending part of this slider 141 by a pivot pin 143. A second pivot pin 144 connects a second section of the lever 142 with an upwardly extending part 145 of a manually movable member 146. This member 146 is made of sheet metal and is U-shaped in cross-section, wherefore it comprises two side-wall portions 147 projected upwardly from a bottom section 148, see Figs. 4 and 5. A cylindrical bearing member 149 is fastened within the bottom of the U-shaped manually operable member 146, its forward end to slidably support such member upon the rod 125. The bottom section 148 of said member 146 extends about the under side of a tubular bearing sleeve 151, which extends into and is anchored within an opening 152 in the plate 139 secured to the back end of the motor 12. The rod 125, which is propelled by and movable unitarily with the motor work member is, therefore, slidable axially of and within both the bearing member 151, which is fixed to the motor casing, and the bearing member 149, which is fixed for movement with the manual control member 146. A third section of the lever 142 is pivotally connected to a link 153 by a pin 154, and the opposite end of this link is pivotally connected to a short lever 155 by a pin 156. Said lever 155 is pivotally connected with the side walls 147 of the manually operated member 146 by a pin 157. A notch 158 of circular contour is formed in the rod 125 for receiving the lower end of the lever 155 which has a corresponding circular contour. Conceivably, the lower end of the lever 155 and the notch 158 therefor constitute a restraining means which is operable through the link 153 for restraining movement of the lever pin 154 lengthwise of the rail 23ᵇ, so that upon movement of the member 146 lengthwise of the rail for effecting a likewise movement of the pin 144 in said lever 142, the pin 143 and hence the slider 141 and said rail 23ᵇ will be caused to move upwardly or downwardly depending upon the direction of movement of the member 146. When for example, the member 146 is moved forwardly or to the left as viewed in Fig. 4, in addition to causing the lever 142 to pivot counterclockwise about the pin 154, which is held against forward advancement by the lower end of the lever 155 in the notch 158, said lever 155 will also be pivoted counter-clockwise about the pin 157, so that with continued forward movement of the member 146, the lower end of the lever 155 will be withdrawn from the notch 158, and the member 146 may then be manually advanced while pulling the counter-clockwise rotated lever 142 and the slider 141 forwardly along the rail 23ᵇ. Upward movement of the rail 23ᵇ, opening the valves FA—CV—EV on the side of the motor opposite to that at which the rail 23ᵇ is disposed, causes forward movement of the motor work member 115, so that when sufficient fluid has been introduced into the motor cylinder, the motor-propelled rod 125 will overtake or catch the manually operated member 146 causing the notch 158 to engage the lower end of the lever 155 for restoring it to the upright position illustrated in Fig. 4, pivoting the lever 142 clockwise and restoring the neutral position of the rail 23ᵇ. This operating feature, consisting of the removal of the lever 155 from the notch 158, makes it possible for an operator to advance the control member 146 to a point predetermining the distance the motor work member will subsequently move when it is physically possible for him to advance the manually movable member 146 at a greater rate of speed than the motor drives its work member 115. Thus, the operator can quickly adjust the manually movable member 146 and attend to other duties during the lag or time interval which may be incurred before the motor work member is automatically brought to rest at the selected point.

The manually movable control member 146 is shown in Fig. 4 in its right most limit of adjustment. When it and the slider 141 are in a more forwardly advanced position to the left in Fig. 4, a similar execution of adjustment may be made for causing the motor work member to move rearwardly or to the right. Under these latter circumstances, movement of the work member 146 to the right while the pivot pin 154 is restrained from rearward movement by the link 153, lever 155, and notch 158, the lever 142 will be pivoted clockwise about the pin 154 for depressing the rail 23ᵇ and causing movement of the work member rearwardly. Should the operator move the control member 146 sufficiently far and in excess of the speed of ensuing movement of the motor-propelled member 125, the lower end of the lever 155 will be withdrawn from the notch 158. Subsequently, the motor work member will move sufficiently far to cause the notch 158 to overtake the lower end of the lever 155 for restoring it to its upright position and consequently restoring the rail 23ᵇ to its neutral position concurrently with the motor work member having moved a distance predetermined by the movement of the control member 146.

Movement of the manually moved member 146 is obtained by means of a link 159, Figs. 2 and 5, which extends from a pivotal connection 161 with holes 162 in the forward end of said member 146 directly to the lower end of a lever 163 conventionally operable over a quadrant 164 at the operator's station in which such lever and quadrant are included. In the present installation the quadrant 164 is secured to a supporting standard 165 for a steering shaft 166 of the tractor.

The bottom of the motor casing carries a comparatively thick bottom plate 167 and a thin separation plate 168, Figs. 4, 6, 8 and 9. These plates and the bottom of the motor casing contain numerous recesses, holes, and channels arranged as shown and described in said co-pending application Serial No. 516,468 for cooperating with the valve group FA—CV—EV operated by the tappet arms 19—21—22 and the corresponding valve group FA'—CV'—EV' (shown diagrammatically in Fig. 1) operated by the tappet arms 19'—21'—22' for causing the selective introduction or withdrawal of fluid from opposite ends of the motor cylinder from single inlet and exhaust conduits FCD and ECD respectively connected to the motor by the coupling member FCDX and ECDX and diversion of fluid from the pressure regulator control through a control conduit as CCD connected with the control port CP, Fig. 3. Said recesses, holes and channels provide conduits corresponding to the conduits FCD', ECD' and CCD' of Fig. 1 respectively communicative with the channels in the coupling fittings FCDX and ECDX, Fig. 6, and the control passage port CP, Fig. 3.

This control apparatus is serviceable for controlling the delivery of actuating fluid to a remotely disposed fluid-driven motor (not shown) as well as the motor 12. Connection of a remotely disposed motor is provided for by ports 221 and 222 communicative with opposite ends of the motor cylinder 34 in Fig. 6. These ports are normally closed by threaded plugs 223, but when said plugs are removed it is possible to connect said ports respectively to the inlet and outlet of an auxiliary motor by means of separate hose. So that the pressure can be immediately built up in a selected end of the motor cylinder 34 for discharge through one of the ports 221 and 222, means is provided for locking the piston 115 against movement. Such locking means consists of a latch rod 224, Fig. 2, pivoted on the motor supporting pin 111 and having an outwardly turned hook 225 on its free end disposable in one of the rock-shaft arm holes 131 when the parts are in the positions shown by dot-dash lines in Fig. 2. When thus hooked in one of the holes 131, the latch rod is operable through the rock-shaft and the piston rod 35 to hold the motor piston in a mid-position between the cylinder ends.

Since the driven member of the remote motor (not shown) will not be drivingly connected with the power-driven valve-closing member 125, the closing of the valves for stopping the remote motor must be done manually by manipulation of the lever 163, Fig. 2, as well as when opening the valves to start such motor. Fluid delivery will continue outwardly of one of the ports 221—222 and inwardly of the other, selectively by the direction the lever 163 is moved from the valve shut-off position, so long as this lever is allowed to remain out of the shut-off position so it is possible to drive a rotary auxiliary motor (not shown) having an inlet and an outlet respectively connected with the ports 221—222. A simple type of reciprocating motor (not shown) comprising only a cylinder and a piston can be caused to move its piston in opposite directions, after the ends of the cylinder are respectively connected with the ports 221—222, by alternately moving the control lever 163 between positions on opposite sides of the valve shut-off position.

While only a single embodiment has herein been shown and described, it should be understood that the invention extends to other embodiments, forms, modifications, structures and details falling within the scope and spirit thereof and not sacrificing all of its material advantages.

What is claimed is:

1. In combination, a tractor having a body with a horizontal elongated portion and an enlarged end portion providing an upper surface which is elevated with respect to such elongated body portion, an engine joined with the enlarged end portion and projecting thereabove and an operator's station on and spaced axially of said body from said engine, an auxiliary power unit comprising an L-shaped casing disposed on the upper side of said body in the space between the engine and said station, said casing comprising an upright leg with a lower end mounted on said body and a leg projecting horizontally from the upright leg lengthwise of said body and in elevated relation thereto to place a projected end portion of such leg above the enlarged body end portion, a rock-shaft bearing means disposed in the projected leg end portion, a ram cylinder in said casing rearwardly of said bearing means and disposed with its axis extending lengthwise of the tractor, a ram plunger reciprocable in the ram cylinder, a rock-shaft disposed transversely of the tractor and journaled in said rock-shaft bearing means, an arm constrained for rocking with the rock-shaft and a connecting rod projecting forwardly from the ram plunger into pivoted connection with said arm for rocking the rock-shaft pursuant to reciprocation of the plunger.

2. In combination, a tractor having a horizontal elongated body with an upwardly projecting enlarged portion providing an elevated upper surface thereon and an operator's station mounted on and reacting above said body and spaced axially of said body from said elevated surface, an auxiliary power unit comprising a casing disposed on the upper side of said body in the space between the elevated surface and said station, said casing being L-shaped with an upwardly extending first leg having its free end lowermost for support by said body and an open-bottom horizontal leg extending from the upper end of the first leg in spaced relation to said body over the elevated surface for rigid mounting of its free end with respect thereto, a rock-shaft having a portion extending laterally into the horizontal casing leg adjacent the free end and rockably supported therein, and a motor supported by said casing at the elevation of the horizontal casing leg, and said motor including a connecting rod extending horizontally in the horizontal casing leg into operable connection with said rock-shaft portion for rocking the same when the motor is energized.

3. In combination, a tractor having a body on which there is an engine projecting thereabove and an operator's station on and spaced axially of said body from said engine, an auxiliary power unit comprising a casing disposed on the upper side of said body in the space between the engine and said station, said casing comprising a hollow open-bottom section spacedly above said body and projecting horizontally from an end adjacent to the engine toward said station and a hollow section projecting downwardly from the opposite end of the horizontal section for receiving support from said body, a bearing in the horizontal casing section adjacent to one end and with its axis directed transversely of the tractor body, a rock-shaft having a portion extending into the casing in journaled support by said bearing, motor attaching means in the downwardly projecting casing section, and a motor in said casing, said motor including parts forcibly relatively movable respectively connected to said attaching means and to said rock-shaft for rocking the latter when said motor is energized.

4. In an auxiliary power unit for mounting upon the body of a tractor at an end of the vehicle engine, an L-shaped casing having a horizontal open-bottom motor-receiving leg for connection at its free end with said engine and a U-section leg projecting downwardly from the other end of the horizontal leg for resting on the tractor body and disposed with its open side facing the space partially embraced by such L-shaped casing, a horizontal rock-shaft-receiving bearing in and directed transversely of said horizontal leg adjacent to its one end, and motor-attaching means in the casing substantially at the junction of said legs.

CARL W. MOTT.

References Cited in the file of this patent
UNITED STATES PATENTS

| Number | Name | Date |
|---|---|---|
| 1,929,804 | Brown | Oct. 10, 1933 |
| 2,039,316 | Johnston | May 5, 1936 |
| 2,283,377 | Lindgren et al. | May 19, 1942 |
| 2,304,365 | McCormick | Dec. 8, 1942 |
| 2,361,122 | Raney et al. | Oct. 24, 1944 |
| 2,399,756 | Mott | May 7, 1946 |
| 2,409,510 | Mott | Oct. 15, 1946 |
| 2,427,871 | Mott | Sept. 23, 1947 |